(12) United States Patent
Gibbons

(10) Patent No.: US 6,401,446 B1
(45) Date of Patent: Jun. 11, 2002

(54) VALVE APPARATUS FOR PROVIDING SHUTOFF AND OVERSPEED PROTECTION IN A GAS TURBINE FUEL SYSTEM

(75) Inventor: Kevin D. Gibbons, Torrington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/602,371

(22) Filed: Jun. 23, 2000

(51) Int. Cl.[7] .............................. F02C 7/232; F02C 9/26
(52) U.S. Cl. ...................... 60/39.281; 60/734
(58) Field of Search .............. 60/39.281, 734

(56) References Cited

U.S. PATENT DOCUMENTS

| 4,187,673 A | * | 2/1980 | Smith ...................... 60/39.281 |
| 4,422,287 A | * | 12/1983 | Stearns et al. ............ 60/39.281 |
| 4,602,479 A | | 7/1986 | Hansen .................... 60/39.281 |
| 5,896,737 A | | 4/1999 | Dyer | |
| 5,927,064 A | | 7/1999 | Dyer et al. | |

FOREIGN PATENT DOCUMENTS

WO    WO9930020    6/1999

* cited by examiner

Primary Examiner—Louis J. Casaregola

(57) ABSTRACT

Methods and apparatus are disclosed for providing shutoff, overspeed protection, and directional control of a bypass flow in a fuel delivery system (10) for a combustion engine, such as a gas turbine engine. A valve pack (72) is integrated into a fuel metering unit (12) and provides shutoff and overspeed protection, including verification of the operational integrity of the shutoff and overspeed protection components. A bypass directional control valve (150) is integrated into one embodiment of the fuel metering unit (12) and provides directional control of a bypass flow from an upstream side of a fuel metering valve (20) based upon the position of a metering valve spool (44) in the metering valve (20).

6 Claims, 5 Drawing Sheets

VALVE APPARATUS FOR PROVIDING SHUTOFF AND OVERSPEED PROTECTION IN A GAS TURBINE FUEL SYSTEM

FIELD OF THE INVENTION

This invention relates generally to fuel control or delivery systems for an engine, more particularly to methods and apparatus for providing shutoff, overspeed protection, and directional control of a bypass flow in a fuel delivery system for a combustion engine, such as a gas turbine engine.

BACKGROUND OF THE INVENTION

It is well-known in the art of fuel delivery systems for combustion engines, such as aircraft gas turbine engines, to use a fixed displacement pump, such as a vane or gear pump, to pressurize fuel prior to its metering and then subsequent delivery to the engine. The fixed displacement pump is typically sized to ensure an excess flow capacity at all possible operating conditions. The output of the pump is delivered to a fuel metering valve which, in conjunction with a bypassing, pressure regulating valve (PRV), meters the rate of fuel flow to the engine.

It is often desirable to have an overspeed limit in combustion engines, such as gas turbine engines, to reduce the risk of failures, such as mechanical overloading and/or excessive operating temperatures, that can occur when an engine exceeds its upper operating speeds. Overspeed conditions can occur in an engine for a number of reasons, such as for example, a sudden unforeseeable reduction in the engine load, a failure in the metering valve of the engine's fuel delivery system, or an erroneous signal from an associated electronic engine control (EEC) which modulates the metering valve to an excessively high flow setting. It is known to provide an overspeed protection system that monitors a speed of the engine, such as the rotational speed of the power turbine of a gas turbine engine, and upon detection of an overspeed condition will reduce or stop the flow of fuel to the engine from the fuel delivery system. One such system that utilizes a mechanical overspeed governor to drive a valve is disclosed in U.S. Pat. No. 5,927,064 issued to Dryer et al. on Jul. 27, 1999, the entire Disclosure which is incorporated herein by reference. Further, when the engine is a critical component, such as a main gas turbine engine for powering an aircraft, it is known to check or verify that the overspeed protection system is functioning properly. In a typical gas turbine engine with a full authority digital electronic control (FADEC) control system and electronic overspeed protection, the proper function of the overspeed system is checked upon shutdown of the engine. In applications where the overspeed system places the control system in shutoff, and is used as the primary shutoff method, verification of proper function of the overspeed system is readily accomplished when the engine is shut down. However, if the overspeed system is not the primary method of shut off, its verification typically requires an additional feedback device (e.g., a switch).

Additionally, for aircraft, FAA FAR 25.1141 dictates that there be a method for indicating when a power assisted valve is open, closed, or traveling between the open and closed positions. Often this is accomplished by an electronic feedback signal from a sensor, such as an electrical switch, proximity transducer, or LVDT, associated with the shutoff valve of the fuel metering unit (FMU) while such systems may work well for their intended purpose, the addition of the sensor, and its associated electronic feedback, can add cost, complexity, and weight to the fuel delivery system.

Fuel delivery systems are also typically required to maintain a shutoff state with all electrical power removed, i.e., shutoff latching. Further, in many applications, while the fuel delivery system is in the shutoff state and the engine is windmilling, an elevated pressure must be maintained by the fuel delivery system to position remote actuators such as are common on gas turbine engines. Shutoff latching and windmill pressurization typically require relatively complex shutoff devices (e.g., latching torque motors or solenoids) and/or additional hardware (e.g., a sequence valve) in order to latch the shutoff state.

It is also known for aircraft gas turbine engine fuel systems to include one or more heat exchangers that transfer heat from various aircraft and/or engine components, such as the engine oil system, to the fuel prior to burning the fuel in the engine. In some systems, proper heat management requires that a bypass flow from the fuel metering unit be directed in one path, such as through one heat exchanger, under certain aircraft and/or engine conditions, and toward another path, such as another heat exchanger, under other aircraft and/or engine conditions. Some systems meet this requirement by providing a separate bypass directional control valve downstream of the fuel metering system that directs the bypass flow to one path or the other in response to a pressure rise in the output of a boost pump for the fuel delivery system, which is approximately a function of engine speed.

SUMMARY OF THE INVENTION

It is a primary object of the invention to provide new and improved apparatus and methods for providing shutoff, overspeed protection, and/or bypass flow directional control in a fuel delivery system that provides a desired fuel flow to an engine.

According to one aspect of the invention, a method is disclosed for providing a commanded shutdown mode, an overspeed shutoff mode, and an overspeed/shutoff test mode in a fuel delivery system for providing a desired fuel flow to an engine. The fuel delivery system includes a metering valve and a shutoff valve, with the metering valve having a shutoff state wherein the metering valve blocks fuel flow to the engine in response to a closing pressure in a modulated pressure chamber of the metering valve and a metering state wherein the valve provides a metered fuel flow to the engine in response to a modulated pressure in the modulated pressure chamber. The shutoff valve has an open state wherein the shutoff valve allows fuel flow to the engine from the metering valve and a closed state wherein the shutoff valve blocks flow to the engine from the metering valve. The method includes the steps of:

in response to an overspeed signal from the system to initiate the overspeed shutoff mode, actuating the shutoff valve to its closed state and directing the closing pressure to the modulated pressure chamber while also attempting to provide the modulated pressure to the modulated pressure chamber, the closing pressure being greater than the modulated pressure;

in response to a commanded shutdown signal from the system to initiate the commanded shutdown mode, actuating the shutoff valve to its closed state while providing the modulated pressure to the modulated pressure chamber; and in response to a speed of the engine dropping below a selected sub-idle speed after the commanded shutdown mode has been initiated, transmitting an overspeed signal from the system and checking the state of the metering valve to determine if the metering valve is in the modulating state or the shutoff state while attempting to provide the modulated pressure to the modulating pressure chamber.

In one aspect of the invention, a valve pack is disclosed for use in a fuel delivery system for providing a desired fuel flow to an engine. The fuel delivery system includes a metering valve having a metering state where the metering valve provides a metered fuel flow to the engine in response to a pressure differential between a reference pressure chamber and a modulated pressure chamber of the valve and a shutoff state wherein the metering valve blocks fuel flow to the engine in response to a pressure differential between the reference and modulated pressure chambers. The valve pack includes a fuel inlet port to receive a metered fuel flow from the fuel metering valve, a fuel outlet port to selectively receive the metered fuel flow from the fuel inlet port to direct the metered fuel flow to the engine, an actuation pressure inlet port selectively connected to a drain to transfer an actuation fuel flow to the drain, a reference pressure inlet port to receive fuel flow at a reference pressure, a reference pressure outlet port to selectively receive the fuel flow at the reference pressure from the reference pressure inlet port to transfer the fuel flow to the modulated pressure chamber of the fuel metering valve, an overspeed activation port, and a shutoff actuation port. The valve pack has an overspeed state in response to the overspeed actuation port being placed in fluid communication with a drain, a shutoff state in response to the shutoff activation port being placed in fluid communication with a drain and flow from the overspeed activation port to the drain being blocked, and a run state in response to flow from both of the overspeed and shutoff drain ports to the drain being blocked. With the valve pack in the overspeed state, the pressure inlet port is connected to the reference pressure outlet port to direct fuel flow at the reference pressure from the reference pressure inlet port to the modulated pressure chamber of the fuel metering valve, the actuation pressure inlet port is opened to receive a fuel flow, and flow from the fuel inlet port to the fuel outlet port is blocked to shutoff the metered fuel flow to the engine. With the valve pack in the shutoff state, the actuation pressure inlet port is opened to receive a fuel flow, fuel flow from the reference pressure inlet port to the reference pressure outlet port is blocked, and fuel flow from the fuel inlet port to the fuel outlet port is blocked to shutoff the metered fuel flow to the engine. With the valve pack in the run state, the fuel inlet port is connected to the fuel outlet port to direct the metered fuel flow from the fuel inlet port to the engine, fuel flow from the reference pressure inlet port to the reference pressure outlet port is blocked, and the actuation pressure inlet port is closed.

In accordance with one aspect, the valve pack further includes a first valve spool positioned in the valve pack to block fuel flow from the fuel inlet port to the fuel outlet port with the valve pack in the overspeed state and with the valve pack in the shutoff state, and a second valve spool positioned in the valve pack to block fuel flow through the actuation pressure inlet port with the valve pack in the run state.

In accordance with another feature, the first and second valve spools are positioned in the valve pack to connect the reference pressure inlet and outlet ports with the valve pack in the overspeed state, the first valve spool is positioned in the valve pack to block fuel flow from the reference pressure inlet port to the reference pressure outlet port with the valve pack in the run state, and the second valve spool is positioned in the valve pack to block fuel flow from the reference pressure inlet port to the reference pressure outlet port with the valve pack in the shutoff state and with the valve pack in the run state.

In accordance with another aspect of the invention, a bypass direction control valve is disclosed for use in a fuel delivery system for providing a desired fuel flow to an engine. The fuel delivery system includes a metering valve chamber and a metering valve spool movable in the metering valve chamber. The bypass directional control valve includes a control pressure port to the metering valve chamber. The control pressure port is open to the metering valve chamber to receive fuel at a control pressure therefrom with the metering valve spool in a. first position, and the control pressure port is closed to the metering valve chamber by the metering valve spool with the metering valve spool in a second position. The bypass directional control valve further includes a bypass flow input port to receive a bypass flow from an upstream side of the metering valve, a first bypass flow output port to selectively receive the bypass flow from the bypass flow input port, a second bypass flow output port to selectively receive the bypass flow from the bypass flow input port, a control pressure chamber connected to the control pressure port to selectively receive fuel therefrom to vary a pressure in the control pressure chamber, and a valve spool movable between first and second positions in response to the pressure in the control pressure chamber. The first bypass flow output port is in fluid communication with the bypass flow input port to receive the bypass flow therefrom with the valve spool in the first position. The second bypass flow output port is in fluid communication with the bypass flow input port to receive the bypass flow therefrom with the valve spool in the second position.

In accordance with another aspect of the invention, a method is disclosed for controlling a bypass flow from a fuel delivery system that provides a desired fuel flow to an engine. The fuel delivery system includes a metering valve chamber and a metering valve spool movable in the metering valve chamber to meter the desired fuel flow to the engine. The method includes the steps of opening and closing a control pressure port from the metering valve chamber in response to movement of the metering valve spool in the metering valve chamber, directing the bypass flow to a first bypass flow outlet port in response to the control pressure port being open, and directing the bypass flow to a second bypass flow outlet port in response to the control pressure port being closed.

Other objects, aspects and advantages will become apparent from the following specification taken in connection with the accompanying drawings.

DETAILED DESCRIPTION OF THE PREFERRED EMBODIMENTS

Figure 1:
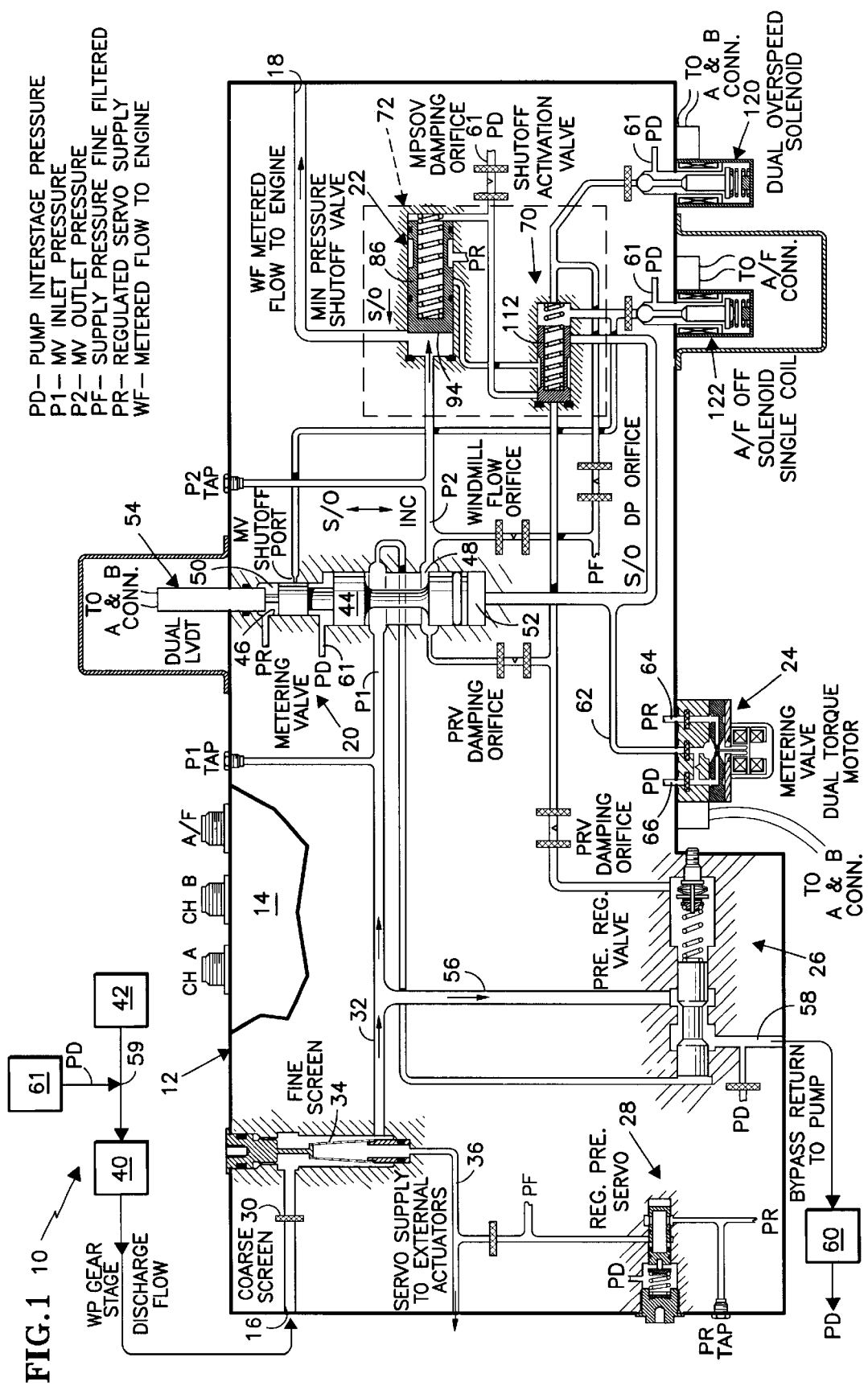
FIG. 1 is a diagrammatic representation of a fuel metering unit in a run mode for use in a fuel delivery system embodying the invention.

Exemplary embodiments of apparatus and methods for providing shutoff, overspeed protection, and directional control of a bypass flow according to the invention are described herein and illustrated in the drawings in connection with a fuel delivery system 10 including a fuel metering unit 12 for providing a desired fuel flow rate to a gas turbine engine (not shown) based on control signals from an EEC such as a FADEC (not shown). However, it should be understood that the methods and apparatus may find utility in other applications and no limitation to use with a gas turbine engine or to a specific form of fuel delivery system is intended except in so far as expressly stated in the appended claims.

With reference to FIG. 1, the fuel metering unit 12 includes a housing assembly, shown schematically at 14, a main fuel inlet port 16, a metered fuel outlet port 18, a metering valve 20 that meters a fuel flow from the fuel inlet port 16 to the fuel outlet port 18, a minimum pressure/shutoff valve (MPSOV) 22 that ensures there is a minimum operating pressure in the fuel metering unit 12 before allowing a fuel flow to the engine and shuts off the fuel flow to the engine in certain modes of operation, a modulating pressure valve 24 that provides fuel at a modulated pressure to the metering valve 20 to control the position of the metering valve in response to control signals from the EEC, a pressure regulating valve (PRV) 26 that regulates the pressure drop across the metering valve 20, a servo pressure regulator that provides a regulated pressure (PR) to the metering valve 20 and other components of the FMU 12, a course filter screen 30 that filters out impurities of the fuel flow to a passage or conduit 32 that directs flow to the metering valve 20 and PRV 26, and a fine filtered screen 34 which filters out impurities from a fuel flow to a passage or conduit 36 that directs a fuel flow to external engine actuators (not shown), the servo pressure regulator 28, and other components of the FMU 12.

The main fuel inlet 16 receives a high pressure fuel flow from a high pressure fuel supply, such as a positive displacement pump 40 that is fed pressurized fuel from a fuel supply (not shown) via an inducer/boost pump 42. The positive displacement pump 40 is driven by the engine so that the amount of fuel delivered by the pump 40 is a function of engine speed. A majority of the fuel flow from the pump is delivered to the metering valve 20 and the PRV 26 via the passage 32 after passing through the course filter screen 30. A portion of the fuel flow from the pump 40 passes through the fine filtered screen 34 to the passage 36. The fuel flow in the passage 36 has a fine filtered pressure PF that is slightly lower than the pressure P1 of the fuel in the passage 32, and higher than the regulated pressure PR provided by the servo pressure regulator 28.

The metering valve 20 has a metering state wherein the metering valve meters the fuel flow to the engine, and a shutoff or closed state wherein the metering valve blocks the flow of fuel to the engine from the fuel inlet port 16 to the fuel outlet port 18. The metering valve 20 includes a metering valve spool 44 that moves between a metering position shown in FIG. 1, and a shutoff or closed position, shown in FIGS. 2 and 4 wherein the valve spool blocks the fuel flow to the engine from to the fuel inlet port 16 to the fuel outlet port 18. In the metering state, the metering valve spool 44 moves to the metering position and translates within a metering valve bore 46 to vary the area of a metering valve window 48, thereby controlling the fuel flow rate to the engine during a run mode. More specifically, the metered fuel flow rate from the metering valve 20 is proportional to the area of the metering valve window 48 multiplied by the square root of the product of the pressure differential (P1–P2) across the metering valve window 48 and the specific gravity of the fuel. The position of the spool 44 is determined by a pressure differential between the regulated pressure PR, which is supplied to a regulated pressure chamber 50 of the valve 20, and a modulated pressure PM that is supplied to a modulated pressure chamber 52 at an opposite end of the valve spool 44 by the modulating pressure valve 24 in response to control signals from EEC. The EEC determines the appropriate position for the spool 44 based on the desired engine speed, and the position of the spool is provided via a sensor 54, illustrated as A LVDt that is monitored by the EEC. The EEC can drive the spool 44 to the shutoff and closed position by commanding the modulating pressure valve 24 to set the modulated pressure PM equal to the regulated pressure PR.

The PRV 26 senses the pressure differential ($P_1 P_2$) across the metering valve 20 and bypasses a portion of the fuel flow from the passage 32 via passages 56 and 58 to maintain the pressure differential across the metering valve 20 to a desired set point. The bypass flow from the passage 56 is directed back to an inlet side of the pump 40 via a bypass system 60. Preferably, the bypass flow is directed back to an interstage inlet 59 of the pump 40, which has a drain pressure PD and, a to common drain 61 is provided and is connected to a low pressure point in the fuel system, such as the inner-stage inlet 59 to the pump 40. For convenience, the drain passages or ports connected to the common drain 61 will simply be referred to herein as "the drain 61" and will be assumed to have a pressure level equal to the drain pressure PD.

In the illustrated embodiment, the modulating pressure valve 24 is provided in the form of a double nozzle flapper type valve that provides a fuel flow at the modulated pressure PM to the modulated pressure chamber 52 of the metering valve 20 via a port 62 by controlling the relative position of a flapper between a port 64 receiving fuel at the regulating pressure PR and a port 66 at the drain 61 and pressure PD in response to the control signals from the EEC. The metering valve 20 is provided in the form of a half area servo type valve.

Because there are many suitable forms for the components and features 16–54 that can satisfactorily perform the run mode of the FMU 12 described above, and the specific details of these components and features will be highly dependent upon each particular application in which the FMU 12 is employed, further details of these components and features will not be given except as provided below.

Having described the components and features that are utilized by the FMU 12 under normal operating or running condition, a description will now be given of the features and components that provide shutoff, overspeed protection, and directional control of a bypass flow according to the invention.

In this regard, the FMU 12 includes a shutoff activation valve 70 that cooperates with the MPSOV 22 to form a valve pack, shown by the dashed line at 72, that provides shutoff, overspeed protection, and shutoff/overspeed protection verification for the FMU 12, while maintaining a sufficient actuation pressure flow that is adequate to maintain pressurization of the external engine actuators during windmilling of the engine.

Figure 2:
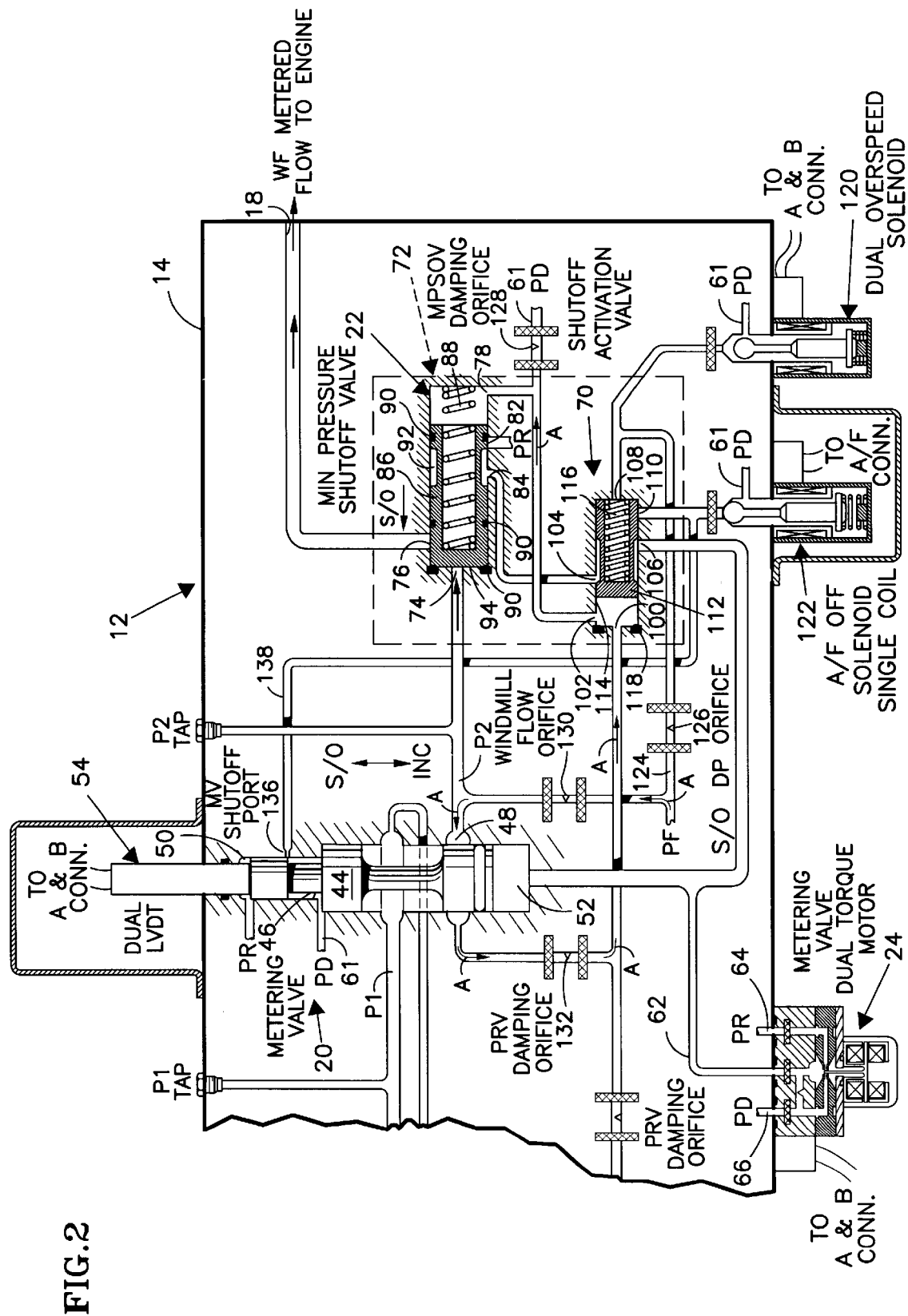
FIG. 2 is an enlarged, partial view of the fuel metering unit in FIG. 1 showing an overspeed mode of operation.
Figure 3:
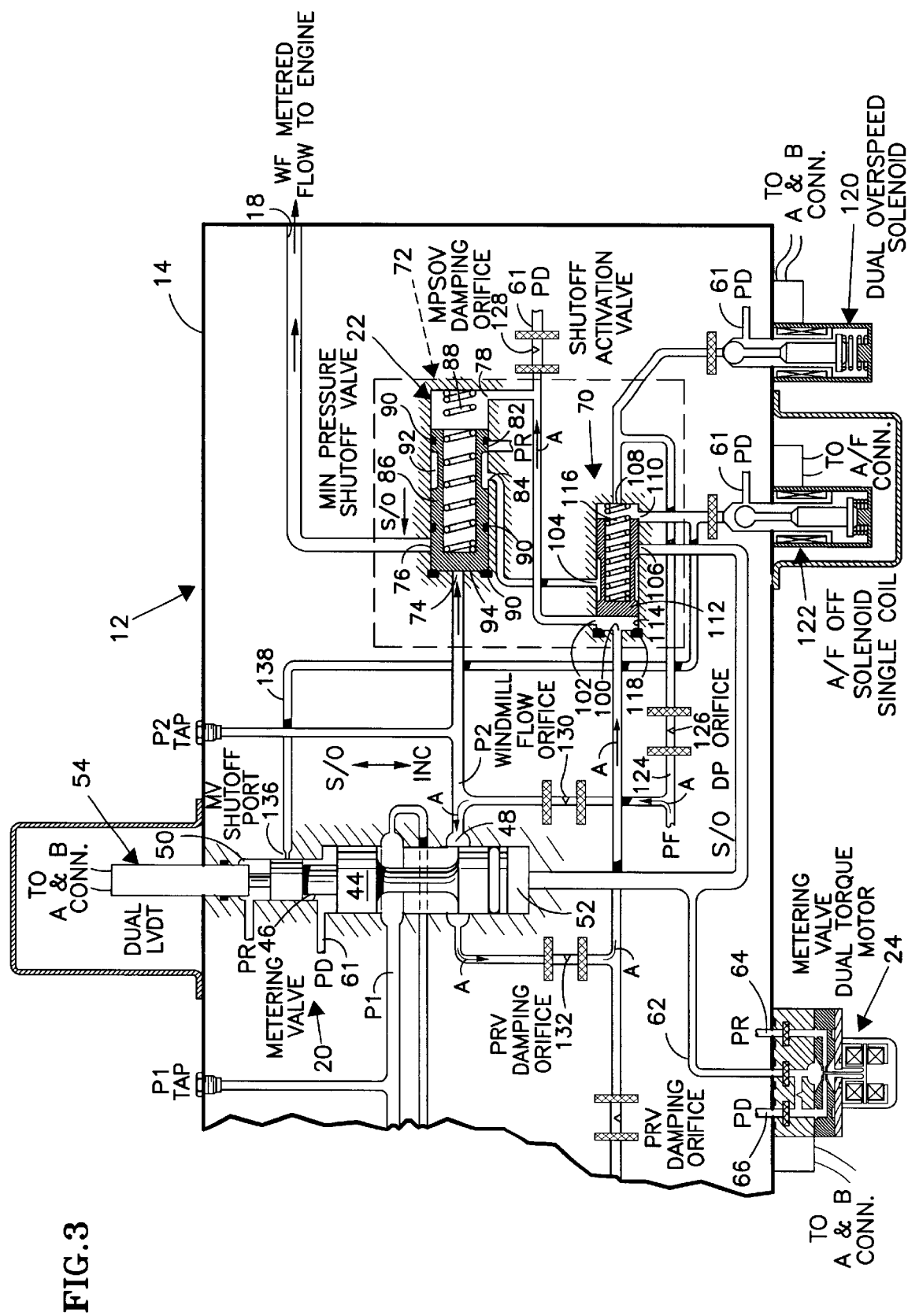
FIG. 3 is a view similar to FIG. 2, but showing a shutdown mode of operation.
Figure 4:
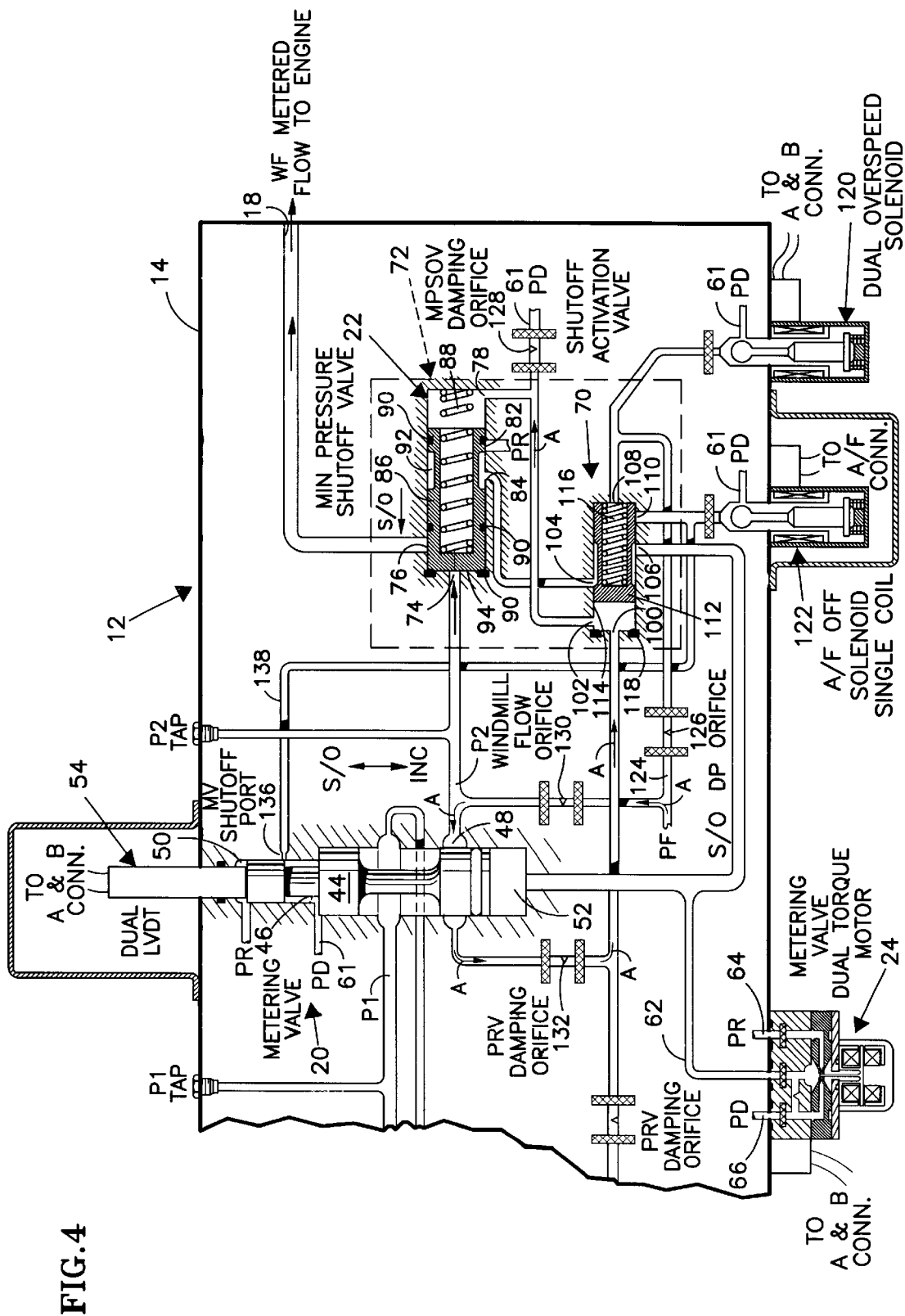
FIG. 4 is a view similar to FIGS. 2 and 3, but showing an overspeed test mode of operation.

As best seen in FIG. 2, the MPSOV 22 includes a fuel inlet port 74 to receive the metered fuel flow from the metering valve 20, a fuel outlet port 76 to selectively receive the metered fuel flow from the fuel inlet port 74 to transfer the metered fuel flow to the engine, an actuation pressure port 78 to selectively receive fuel at an actuation pressure, a reference pressure inlet port 82 to receive fuel flow at the reference pressure PR, a reference pressure outlet port 84 to selectively receive the fuel flow at the reference pressure PR from the reference pressure inlet port 82, and a shutoff valve spool 86, movable between an open position shown in FIG. 1 and a closed position shown in FIGS. 2–4 in response to a pressure differential between the actuation port 78 and the fuel inlet port 74. A suitable spring 88 such as a helical compression spring is provided to bias the valve spool 86 toward the closed position and to ensure that the metered fuel flow has a sufficient minimum pressure. Suitable seals, such as o-rings 90, are provided in the MPSOV 22 to prevent undesirable leakage. The valve spool 86 includes an annular channel 92 that connects the reference pressure inlet and outlet ports 82 and 84 when the valve spool 86 is in the closed position. In this regard, it should be noted that the relative spacing of the ports 76, 82 and 84, the channel 92 and the end 94 of the valve spool 86 are such that the valve spool 86 blocks the fuel outlet port 76 whenever the reference pressure inlet and outlet ports 82 and 84 are connected.

The shutoff activation valve 70 includes an actuation pressure inlet port 100 to receive a fuel flow at the actuation pressure, an actuation pressure outlet port 102 connected to the actuation pressure port 78 of the MPSOV 22 to direct the fuel flow from the inlet port 100 thereto, a reference pressure inlet port 104 connected to the reference pressure outlet port 84 to receive the fuel flow at the reference pressure PR therefrom, a reference pressure outlet port 106 connected to the modulated pressure chamber 52 to deliver the fuel flow at the reference pressure PR thereto, an overspeed activation port 108, a shutoff activation port 110, and a shutoff activation spool 112 movable in a valve bore 114 between a first position shown in FIG. 1, a second position shown in FIG. 3, and a third position shown FIG. 2 in response to a pressure differential between the actuation pressure inlet port 100 and the overspeed activation port 108. A suitable spring 116, such as a helical compression spring, is provided to bias the valve spool 112 towards the first position, and a suitable o-ring 118 is provided to prevent undesirable leakage through the actuation pressure inlet port 100 when the valve spool 112 is in the first position. As seen in FIG. 1, with the shutoff activation valve spool 112 in the first position, fuel flow between the actuation pressure inlet and outlet ports 100 and 102 and between the reference pressure inlet and outlet ports 104 and 106 is blocked and the overspeed activation and shutoff activation ports 108 and 110 are in fluid communication. As seen in FIG. 3, with the shutoff activation valve spool 112 in the second position, fuel flow between the reference pressure inlet and outlet ports 104 and 106 is blocked, fuel flow from the overspeed activation port 108 to the shutoff activation port 110 is modulated, and the actuation inlet port 100 is in fluid communication with the actuation pressure outlet port 102 to transfer the fuel flow at the actuation pressure thereto. As seen in FIG. 2, with the valve spool 112 in the third position, the reference pressure inlet port 104 is in fluid communication with the reference pressure outlet port 106 to transfer a fuel flow thereto, the actuation pressure inlet port 100 is in fluid communication with the actuation pressure outlet port 102 to transfer a fuel flow thereto, and flow between the overspeed activation and shutoff activation ports 110 and 108 is blocked.

The FMU 12 further includes an overspeed solenoid valve 120 having an open state wherein the overspeed activation port 108 is connected to the drain 61 to transfer a fuel flow thereto, and a closed state wherein fuel flow from the overspeed activation port 108 through the drain 61 is blocked. A shutoff solenoid valve 122 is also provided and has an open state wherein the shutoff activation port 110 is connected to the drain 61 to transfer a fuel flow thereto, and a closed state wherein fuel flow from the shutoff activation port 110 through the drain 61 is blocked. Both of the solenoid valves 120 and 122 are connected to the EEC and move from their open state to their closed state in response to signals from the EEC. Preferably, both of the solenoid valves 120 and 122 are biased towards their closed position or state so that the valves remain in their closed position when power is removed therefrom and move to their open position or state when energized by the EEC. Because there are many suitable forms of solenoid valves and the precise details of the solenoid valves 120 and 122 will be highly dependent upon the requirements of the particular application, further details of these components will not be provided for the sake of brevity.

A passage 124 connects the shutoff activation port 108 to the passage 36 to receive fuel flow at the fine filtered pressure PF from the passage 36 downstream of the fine screen filter 34. This allows the overspeed activation port 108 to be pressurized at the fine filtered pressure PF under certain conditions. The passage 124 includes a shutoff/ overspeed delta pressure ΔP orifice 126 which produces a pressure drop that allows the pressure at the overspeed activation port 108 to be reduced to a level below the fine filtered pressure PF under certain conditions.

A MPSOV damping orifice 128 is provided between the drain 61 and the actuation and actuation pressure outlet ports 78 and 102. As will be explained in more detail below, the orifice 128 allows the pressure at the actuation pressure port 78 to be reduced to the drain pressure PD when there is no flow through the orifice 128 and to be increased to a pressure greater than the drain pressure PD when there is a flow through the orifice 128.

The valve pack 72 has a normal operating or run state shown in FIG. 1, an overspeed state shown in FIG. 2, and a shutoff state shown in FIG. 3. In the run state, flow from both the overspeed activation port 108 and the shutoff activation port 110 to the drain 61 is blocked by the respective solenoid valves 120 and 122, as seen in FIG. 1. The valve pack 72 assumes the overspeed state in response to the overspeed drain port 108 being placed in fluid communication with the drain 61 by the solenoid valve 120 moving to the open state, as shown in FIG. 2. The valve pack 72 assumes the shutoff state in response to the shutoff activation port 110 being placed in fluid communication with the drain by the valve 122 moving to the open state while flow from the overspeed activation port 108 to the drain 61 is blocked by the solenoid valve 120 in the closed state.

The FMU 12, in connection with the valve pack 72, has a normal operating or run mode shown in FIG. 1, an overspeed mode, shown in FIG. 2, a shutoff mode shown in FIG. 3, and a shutoff/overspeed verification test mode shown in FIG. 4. The general operation of the FMU 12 in the normal operating or run mode has already been described. In the run mode, the valve pack 72 is in the run state, with both the overspeed and shutoff solenoid valves 120 and 122 blocking flow to the drain from the overspeed and shutoff activation ports 108 and 110, respectively. Because there is no flow from the ports 108 and 110, the fuel pressure at the ports 108 and 110 is at least nominally equal to the fine filtered pressure PF, which in combination with the spring 116, is sufficient to hold the valve spool 112 in its closed position against the pressure at the actuation pressure inlet port 100, which is essentially equal to P2. Thus, the valve spool 112 blocks the flow through the actuation pressure inlet port 100 to the actuation pressure outlet port 102 and the actuation port 78 of the MPSOV 22. This provides a fuel pressure at the actuation port 78 that is equal to the drain pressure PD, which allows the valve spool 86 to be slewed to the right to its open position against the bias force of the spring 88, thereby connecting the fuel inlet and outlet port 74 and 76 so that the metered fluid flow may flow from the metering valve 20 to the engine. It should be noted that when the valve pack 72 is in the run state with the valve spool 86 in the open position and the valve spool 112 in the first position, flow from the reference pressure inlet port 82 to the actuation outlet port 116 is blocked by the valve spools 86 and 112. This results in a fuel pressure equal to the modulated fuel pressure PM at the reference pressure outlet port 106 and in the modulated pressure chamber 52, thereby allowing the EEC to control the position of the metering valve spool 44 through the modulating pressure valve 24 to meter the fuel flow to the engine.

To enter the overspeed mode of operation, the EEC sends an overspeed signal to the overspeed solenoid valve 120, thereby energizing the valve 120 and moving the valve 120 to the open position to connect the overspeed activation port 108 to the drain 61. The resulting flow through the passage 124 produces a pressure drop across the shutoff/overspeed ΔP orifice 126 that reduces the pressure at the overspeed activation port 108 to a level that is less than the fine filtered pressure PF, thereby allowing the pressure at the actuation inlet port 100 to slew the valve spool 112 to the third position shown in FIG. 2. This allows a flow through the actuation pressure inlet port 100 to the actuation port 78 and the drain 61 via the actuation pressure outlet port 102. The fuel flow from the actuation pressure inlet port 100 through the MPSOV damping orifice 128 is sufficient to maintain a back pressure at the actuation port 78 that will slew the valve spool 86 to the closed position against the pressure P2 at the fuel inlet port 74, thereby blocking the metered fuel flow from the fuel inlet port 74 to the fuel outlet port 76 to shutoff the metered fuel flow to the engine. With the valve spool 86 in the closed position and the valve spool 112 in the third position, the reference pressure inlet port 82 is connected to the reference pressure outlet port 102 via the reference pressure outlet port 84 and the reference pressure inlet port 104. This allows the valve pack 72 in the overspeed state to direct a fuel flow at the reference pressure PR to the modulated pressure chamber 52 of the fuel metering valve 20, thereby forcing the metering valve spool 44 to the closed position. In this regard, it should be noted that the fuel flow at the reference pressure PR overcomes the fuel flow from the modulating pressure valve 24 because the reference pressure PR is always greater than or equal to the modulated pressure PM. Thus, the metering valve 20 is placed in its closed state regardless of the control signal to the modulating pressure valve 24 from the EEC, which still may be sending control signals based on the fuel schedule for the engine. In addition to slewing the MPSOV 22 to the closed state, the actuation pressure flow through the actuation pressure inlet port 100 creates a flow from the passage 36 through a windmill flow orifice 130, a PRV ΔP orifice 132 and the MPSOV damping orifice 128, as shown by Arrows A. This flow creates a sufficient delta pressure across the MPSOV damping orifice 128 to maintain the fine filtered pressure PF at a level that is adequate to position the external actuators when the engine is windmilling as a result of the discontinuation of the fuel flow to the engine.

To initiate the shutoff mode, the EEC sends a commanded shutoff signal to the shutoff solenoid valve 122, thereby energizing the solenoid valve 122 to the open position connecting the shutoff activation port 110 to the drain 61, while the overspeed solenoid valve 120 is de-energized and in the closed position to block flow from the overspeed activation port to the drain 61. This creates a flow from the passage 126 through the overspeed activation port 108 to the shutoff activation port 10 and then to the drain 61. The resulting pressure drop across the shutoff/overspeed ΔP orifice 126 reduces the pressure at the overspeed activation port 108 to a level that allows the pressure at the actuation pressure inlet port 100 to slew the valve spool 112 to the second position shown in FIG. 3. The valve spool 112 is prevented from moving to the third position because, with the overspeed solenoid valve 120 in the closed position, movement of the valve spool 112 toward the third position closes the shutoff activation port 110, thereby reducing the fuel flow across the shutoff/overspeed ΔP orifice 126 and raising the pressure at the overspeed activation port 108, which counteracts further movement of the spool 112 toward the third position. Accordingly, with the valve pack 72 in the shutoff state, the fuel flow through the shutoff activation port 110 is modulated to maintain a force balance on the valve spool 112 between the pressure at the actuation pressure inlet port 100 acting on one side of the valve spool 112 and the spring 116 and the pressure at the overspeed activation port 108 acting on the other end of the valve spool 112. This maintains the valve spool 112 in its second position where the actuation pressure inlet port 100 is open to receive flow therethrough to direct the flow to the actuation pressure port 78 through the activation pressure outlet port 102. As in the overspeed mode and state, the rate of the fuel flow through the actuation pressure inlet port 100 and across the MPSOV damping orifice 128 is sufficient to create an adequate pressure level at the actuation port 78 to slew the valve spool 86 to the closed position, thereby blocking the metered fuel flow from the fuel inlet port 74 to the fuel outlet port 76 to shutoff the metered fuel flow to the engine. However, unlike the overspeed mode and state, the valve spool 112 in the shutoff mode and state blocks fuel flow between the reference pressure inlet and outlet ports 104 and 106, rather than connecting the reference pressure inlet and outlet ports 104 and 106. This allows the modulating pressure valve 24 to maintain the modulated fuel pressure PM at the actuation pressure outlet port 102 and in the modulated pressure chamber 52. Accordingly, in the shutoff mode and state, the EEC can control the position of the metering valve spool 44 by sending command signals through the modulating pressure valve 24. However, because the valve spool 86 of the MPSOV 22 is in the closed position, there is no fuel flow to the engine even when the metering valve spool 44 is commanded to a position based on the fuel schedule for the engine. As in the overspeed mode and state, if the metering valve spool 44 moves to the closed position, the rate of fuel flow through the actuation pressure inlet port 100 produces a fuel flow across the PRV ΔP and windmill flow orifices 130 and 132 and the MPSOV damping orifice 128 that allows the PRV valve 26 to operate and maintain the fine filtered pressure PF at a level that is adequate to position the external actuators when the engine is windmilling as a result of the shutoff of the metered fuel flow to the engine.

To place the FMU 12 in the shutoff/overspeed verification test mode, the EEC resets the overspeed set point to a selected sub-idle engine speed after the EEC has transmitted the commanded shutdown signal to initiate the shutoff mode. It should be noted that if the engine fails to slow down, the EEC can, as one option, be configured to recognize that there has been a failure in the shutoff mode of the FMU 12 and to initiate a shutdown of the engine by using the modulated pressure valve 24 to command the metering valve spool 44 to its closed position, thereby shutting off the metered fuel flow to the engine. In this regard, the EEC can also initiate a signal to the air frame indicating a failure in the shutoff components of the FMU 12. When the engine speed reaches the selected sub-idle speed, the EEC will transmit the overspeed signal to the overspeed solenoid valve 120, thereby energizing the valve 120 to the open position connecting the overspeed activation port 108 to the drain 61, as shown in FIG. 4. As in the overspeed mode, this allows the flow through the shutoff/overspeed ΔP orifice 126 to flow to the drain 61 through the overspeed solenoid valve 120, thereby allowing the valve spool 112 to slew to the third position without shutting off the fuel flow through the shutoff/overspeed, ΔP orifice 126. Because the valve spool 86 of the MPSOV 22 is already in the closed position, the movement of the valve spool 112 to the third position serves to connect the reference pressure inlet port 82 to the reference pressure outlet port 106 via the reference pressure outlet port 84 and the reference pressure inlet port 104. This places the valve pack 72 in the overspeed state and allows the valve pack 72 to direct a fuel flow to the modulated pressure chamber 52 at the reference pressure PR, thereby overriding the control of the metering valve spool 44 by the modulated pressure valve 24 and slewing the metering valve spool 44 to the closed position. The EEC sends command signals to the modulating pressure valve 24 to position the metering valve spool 44 in its modulating state while the EEC monitors the position of the metering valve spool 44 based on the signal from the LVDT 54 to determine if the metering valve spool 44 is at its commanded position or the closed position. Proper operation of the overspeed and shutdown components of the FMU 12 is verified by the EEC if it detects that the metering valve spool 44 is in its closed position, rather than in the position currently being commanded by the EEC through the modulating pressure valve 24. On the other hand, the EEC will detect a failure of the overspeed and shutdown components if the EEC detects that the metering valve spool 44 has not been driven to the closed position, thereby indicating that the modulating pressure valve 24 has not been overridden and that at least one of the following has failures may have occurred:

1. The overspeed solenoid valve has:
   a) failed closed or
   b) has not received the overspeed signal;
2. The shutoff activation valve spool 112 has failed to translate to the third position; or
3. The MPSOV valve spool 86 has failed to translate to the closed position. In response to an indication that the metering valve spool 44 has not been driven to the closed position, the EEC will raise a fault flag that will force maintenance of the FMU 12. Further, if the fault flag is raised, the EEC will not send a signal to the cockpit that full shutoff has been achieved. This will indicate to the pilot that the FMU 12 may still be sending flow to the engine.

In some applications, the time required for the engine to reach the selected sub-idle speed may exceed the amount of time for which power will be supplied to the shutoff solenoid valve 122. In this situation, the EEC will command the metering valve spool 44 to its closed position prior to removal of power from the shutoff solenoid valve 122. This assures that the shutoff state will be achieved when the power is removed from the valve 122. Then, when the engine speed reaches a sub-idle speed and the overspeed signal is sent to energize the overspeed solenoid 122, the EEC will attempt to command the metering valve spool 44 to its modulating state via command signals to the modulating pressure valve 24, while continually monitoring the position of the metering valve spool via 44 the LVDT 54. As before, if the metering valve spool 44 does not move from its closed position, the test is passed. On the other hand, if the metering valve spool 44 does move, a failure of the overspeed and shutdown components of the FMU 12 is indicated.

As best seen in FIG. 4, the FMU 12 also includes a shutoff latching port 136 that is connected to the shutoff activation port 110 by a passage 138. When the metering valve spool 44 is driven to the closed position, the metering valve spool connects the shutoff port 136 to the drain 61, thereby allowing flow across the shutoff/overspeed ΔP orifice 126, through the overspeed and shutoff activation ports 108 and 110 to the drain 61 through the shutoff latching port 136, even if the shutoff solenoid valve 122 is de-energized and moved to the closed position. Because the modulating pressure valve 24 has a null bias such that the valve 24 sets the modulating pressure PM to equal the reference pressure PR when there is no current to the modulating pressure valve 24, the flow through the shutoff port 136 serves to latch the FMU 12 in the shutoff mode, with the valve spool 86 in its closed position and the metering valve spool 44 in its closed position, even when all current is removed from the valves 24, 120 and 122.

For purposes of this Disclosure, references to the modulated pressure PM, the reference pressure PR, the drain pressure PD, the fine filtered pressure PF, the pressure P1, the pressure P2, and the actuation pressure include pressure losses through the various passageways and fully opened and connected valve ports of the FMU 12, which pressure losses will typically be negligible. For example, the pressures at the reference pressure inlet and outlet ports 82, 84, 104 and 106 are all considered to be at the reference pressure PR with the valve spool 86 in the closed position and the valve spool 112 in a third position, as shown in FIG. 2, even though there will be some pressure losses, typically negligible, as the fuel flows from the inlet port 82 through to the outlet port 106.

Figure 5:
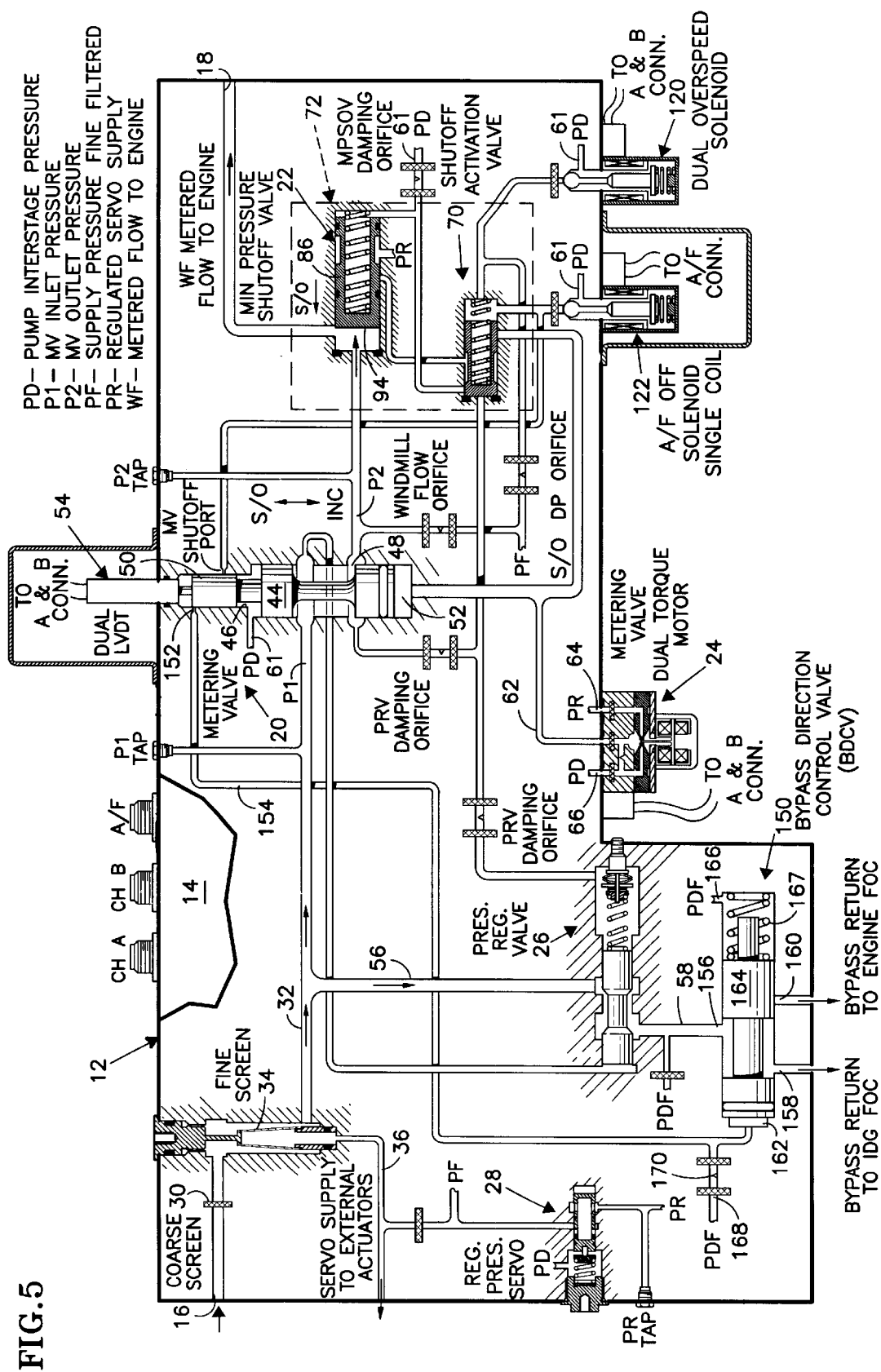
FIG. 5 is a diagrammatic view showing a modification to the fuel metering unit of FIG. 1 incorporating a bypass directional flow control valve.

A modification of the FMU 12 incorporating a bypass direction control valve 150 is shown in FIG. 5. This embodiment of the FMU 12 is identical to the embodiment shown in FIGS. 1–4, with the exception of the additions of the bypass direction control valve (BDCV) 150, a control pressure port 152 to the reference pressure chamber 50 of the metering. valve 20, and a passage 154 connecting the control pressure port 152 to the BDCV 150. The BDCV 150 includes a bypass flow input port 156 connected to the passage 58 to receive the bypass flow from the upstream side of the metering valve 20, a first bypass output port 158 to selectively receive the bypass flow from the bypass input port 156, a second bypass flow output port 160 to selectively receive the bypass flow from the bypass flow input port 156, a control pressure chamber 162 connected to the control pressure port 152 to selectively receive fuel at the reference pressure PR to vary the pressure in the control pressure chamber 162, and a valve spool 164 that is movable between first and second positions in response to the pressure in the control pressure chamber 162. A suitable spring 167, such as a helical compression spring is provided to bias the valve spool toward the first position. In the first position, the valve spool 164 connects the first bypass flow output port to the bypass flow input port 156 to receive the bypass flow therefrom and to direct the bypass flow to a heat exchanger (not shown), such as a fuel/oil heat exchanger in an Integrated Drive Generator (IDG) associated with the engine. In the second position, the valve spool 164 connects the second bypass flow output port 160 to the bypass flow input port to receive the flow therefrom and to direct the flow to another heat exchanger, such as a fuel/oil heat exchanger for the engine oil. The end of the valve spool 164 opposite from the control pressure chamber 162 is maintained at the drain pressure PD by a drain port 166. When the metering valve spool 44 is positioned to block the control pressure port 152, the fuel pressure in the pressure control chamber 162 is reduced to the drain pressure PD via a drain port 168 connected to the control pressure port 162 through an orifice 170. This balances the pressure on both sides of the valve spool 164, thereby allowing the spring 167 to slew the valve spool 164 to the first position. When the metering valve spool 44 moves to a second position that opens the control pressure port 152 to the reference pressure chamber 50, fuel at the reference pressure PR flows through the control pressure port 152 and the passage 154 to the control pressure chamber 162. The orifice 170 has a sufficient restriction to maintain the pressure in the control pressure chamber 162 at a level that is adequate to slew the valve spool 164 to the second position. It should be appreciated that because the control pressure port 152 is opened and closed based upon the position of the metering valve spool 44, the directional control of the bypass flow via the BDCV 150 is directly related to the metered fuel flow rate to the engine. This allows for the bypass flow to be used for cooling selected components at selected engine conditions, such as the IDG at low engine power conditions, like ground idle, and then for cooling the engine oil cooler for other power conditions such as the mid to high power conditions, that occur during takeoff and flight idle.

While it is preferred that all of the valves 20, 22, 24, 26, 28, 70, 120, 122 and 150 be integrated into a single housing assembly 14, it may be advantageous in some applications to provide one or more of these valves in a separate housing that is connected to the housing assembly 14 by suitable fuel lines or conduits.

It should be appreciated that, according to one aspect, by using the signal from the sensor 54, the fuel delivery system 10 can verify the operational integrity of the overspeed components during the shutdown of the engine without requiring additional hardware, either hydromechanical or electromechanical, for this feature. Additionally, according to another aspect, by utilizing the feedback signal from the sensor 54, the fuel delivery system 10 can verify positive fuel shutoff for shutoff indication to the cockpit without requiring additional hardware, either hydromechanical or electromechanical. Further, according to yet another aspect, by providing the shutoff latching port 136 between the valve pack 72 and the fuel metering valve 20, the fuel metering unit 12 can achieve shutoff latching without requiring additional hardware, either hydromechanical or electromechanical. As another advantage, according to one aspect, by providing the flow path through the windmill orifice 130, the PRV orifice 132 and the MPSOV damping orifice 128 when the metering valve spool 44 is in the closed position during the shutoff and/or overspeed modes, windmill pressurization of the external actuators is achieved without requiring additional hardware, either hydromechanical or electromechanical. Finally, according to another aspect, by providing a hydraulic signal from the fuel metering valve 20 to the bypass directional control valve 150, the fuel metering unit 12 can provide automatic bypass directional control switching as a function of the metered fuel flow rate. It should be appreciated that while the disclosed methods and apparatuses make the above expressly identified advantages possible, these advantages are not required and it may be possible to practice the invention without realizing all or any of the above expressly identified advantages.

What is claimed is:

1. A valve pack for use in a fuel delivery system for providing a desired fuel flow to an engine, the fuel deliver system including a metering valve having a metering state where the metering valve provides a metered fuel flow to the engine in response to a pressure differential between a reference pressure chamber and a modulated pressure chamber of the valve and a shutoff state wherein the metering valve blocks fuel flow to the engine in response to a pressure differential between the reference and modulated pressure chambers; the valve pack comprising:

a fuel inlet port to receive a metered fuel flow from the fuel metering valve;

a fuel outlet port to selectively receive the metered fuel flow from the fuel inlet port to direct the metered fuel flow to the engine;

an actuation pressure inlet port selectively connected to a drain to transfer an actuation fuel flow to the drain;

a reference pressure inlet port to receive fuel flow at a reference pressure;

a reference pressure outlet port to selectively receive the fuel flow at the reference pressure form the reference pressure inlet port to transfer the fuel flow to a modulated pressure chamber of the fuel metering valve;

an overspeed activation port; and a shutoff activation port;

the valve pack having an overspeed state in response to the overspeed activation port being placed in fluid communication with a drain, a shutoff state in response to the shutoff activation port being placed in fluid communication with a drain and flow from the overspeed activation port to the drain being blocked, and a run state with flow from both of the overspeed and shutoff activation ports to the drain being blocked;

with the valve pack in the overspeed state, the reference pressure inlet port is connected to the reference pressure outlet port to direct fuel flow at the reference pressure from the reference pressure inlet port to the modulated pressure chamber of the fuel metering valve, the actuation pressure inlet port is opened to receive a fuel flow, and flow from the fuel inlet port to the fuel outlet port is blocked to shutoff the metered fuel flow to the engine;

with the valve pack in the shutoff state, the actuation pressure inlet port is opened to receive a fuel flow, fuel flow from the reference pressure inlet port to the reference pressure outlet port is blocked, and fuel flow from the fuel inlet port to the fuel outlet port is blocked to shutoff the metered fuel flow to the engine;

with the valve pack in the run state, the fuel inlet port is connected to the fuel outlet port to direct the metered fuel flow from the fuel inlet port to the engine, fuel flow from the reference pressure inlet port to the reference pressure outlet port is blocked, and the actuation pressure inlet port is closed;

a first valve spool positioned in the valve pack to block fuel flow from the fuel inlet port to the fuel outlet port with the valve pack in the overspeed state and with the valve pack in the shutoff state; and a second valve spool positioned in the valve pack to block fuel flow through the actuation pressure inlet port with the valve pack in the run state.

2. The valve pack of claim 1 wherein the first and second valve spools are positioned in the valve pack to connect the reference pressure inlet and outlet ports with the valve pack in the overspeed state the first valve spool is positioned in the valve pack to block fuel flow from the reference pressure inlet port to the reference pressure outlet port with the valve pack in the run state and the second valve spool is positioned in the valve pack to block fuel flow from the reference pressure inlet port to the reference pressure outlet port with the valve pack in the shutoff state and with the valve pack in the run state.

3. The valve pack of claim 1 further comprising an additional port connected to the shutoff activation port to selectively transfer a fuel flow from the shutoff activation port to a drain with the metering valve in the shutoff state.

4. A fuel delivery system for providing a desired fuel flow to an engine from a pump, the system comprising:

- a metering valve including a metering valve spool, a first pressure chamber at one end of the valve spool, a modulated pressure chamber at the other end of the valve spool to receive a modulated pressure, the valve spool having a metering position where the valve provides a metered fuel flow to the engine in response to a pressure differential between the reference and modulated pressure chambers and a closed position wherein the metering valve blocks fuel flow to the engine in response to a pressure differential between the reference and modulated pressure chambers
- a servo valve including a modulated output port connected to the modulated pressure chamber to supply the modulated pressure thereto;
- a shutoff valve including
  - a fuel inlet port connected to the metering valve to receive the metered fuel flow therefrom,
  - a fuel outlet port selectively connected to the fuel inlet port to direct the metered fuel flow to the engine,
  - a first reference pressure inlet port to receive a fuel flow at a reference pressure,
  - a first reference pressure outlet port,
  - an actuation port to receive a fuel flow at an actuation pressure, and
  - a shutoff valve spool movable between open and closed positions in response to a pressure differential between the actuation port and the fuel inlet port,
- a shutoff activation valve including
  - an actuation pressure inlet port to receive a fuel flow at the actuation pressure,
  - an actuation pressure outlet port connected to the actuation pressure port of the shutoff valve to direct the fuel flow at the actuation pressure thereto,
  - a second reference pressure inlet port connected to the reference pressure outlet port to receive the fuel flow at the reference pressure therefrom,
  - a second reference pressure outlet port connected to the modulated pressure chamber of the metering valve to deliver the fuel flow at the reference pressure thereto,
  - a third port,
  - a fourth port, and
  - a shutoff activation valve spool movable between first, second, and third positions in response to a pressure differential between the actuation pressure inlet port and the third port,
  - the third and fourth ports being in fluid communication and flow between the actuation pressure inlet and outlet ports and between the second reference pressure inlet and outlet ports being blocked with the shutoff activation valve spool in the first position,
  - flow between the second reference pressure inlet and outlet ports being blocked, fuel flow from the third port to the fourth port being modulated, and the actuation pressure inlet port being in fluid communication with the actuation pressure outlet port to transfer the fuel flow at the actuation pressure thereto with the shutoff activation valve spool in the second position,
  - the second reference pressure inlet port being in fluid communication with the second reference pressure outlet port to transfer a fuel flow thereto, the actuation pressure inlet port being in fluid communication with the actuation pressure outlet port to transfer a fuel flow thereto, and flow between the third and fourth ports being blocked with the valve in the third position;
- an overspeed solenoid valve having an open state wherein the third port is connected to a drain to transfer a fuel flow thereto, and a closed state wherein fuel flow between the third port and the drain is blocked;
- a shutoff solenoid valve having a open state wherein the fourth port is connected to the drain to transfer a fuel flow thereto, and a second state wherein fuel flow between the fourth port and the drain is blocked.

5. The fuel delivery system of claim 4 further comprising a shutoff latching port connected to the fourth port of the shutoff activation valve to receive a fuel flow therefrom, the shutoff latching port being connected to the drain with the metering valve in the closed state and being disconnected from the drain with the metering valve spool in the metering position.

6. The fuel delivery system of claim 4 further comprising a fuel flow line connecting the actuation pressure inlet port to an upstream side of the metering valve, and at least one orifice positioned in the fuel flow line between the upstream side of the metering valve and the actuation pressure inlet port.

\* \* \* \* \*